May 16, 1961 F. A. A. ARNOLD 2,984,438
MAGNETIC SAFETY BARRIER FOR AIRCRAFT LANDING STRIPS
Filed Feb. 6, 1959 2 Sheets-Sheet 1
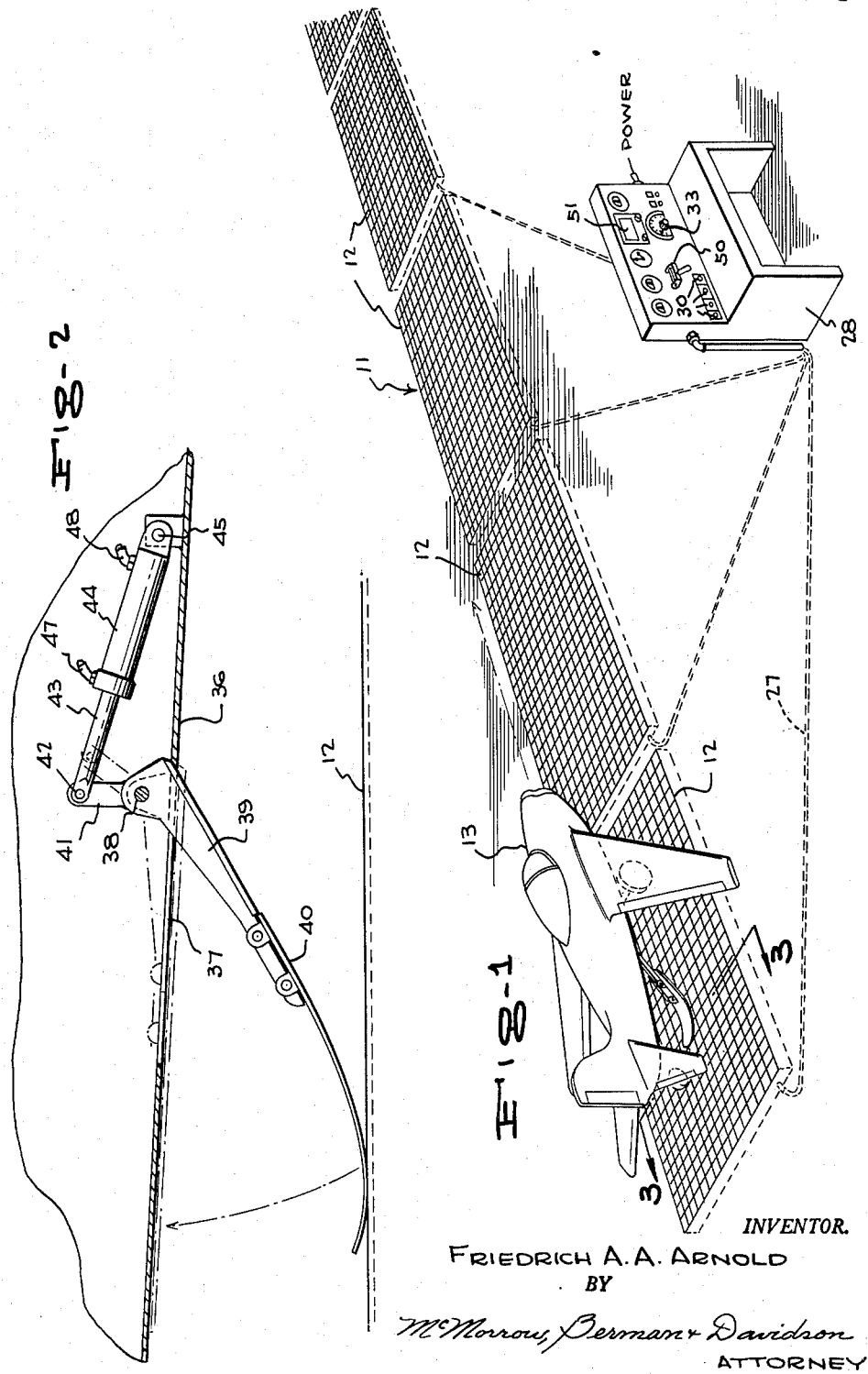
INVENTOR.
FRIEDRICH A. A. ARNOLD
BY
McMorrow, Berman & Davidson
ATTORNEYS May 16, 1961  F. A. A. ARNOLD  2,984,438
MAGNETIC SAFETY BARRIER FOR AIRCRAFT LANDING STRIPS
Filed Feb. 6, 1959  2 Sheets-Sheet 2
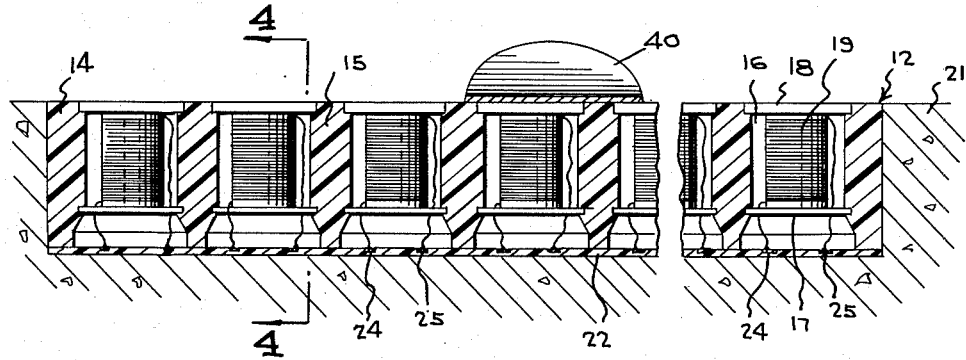
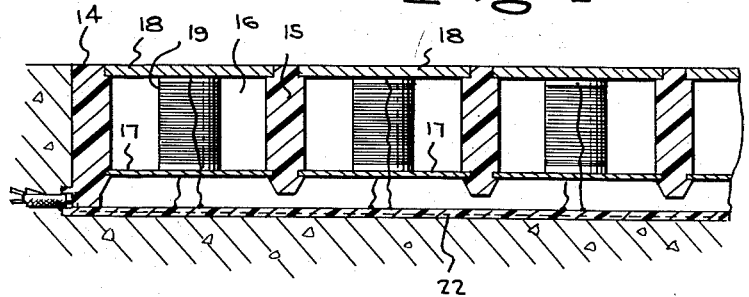
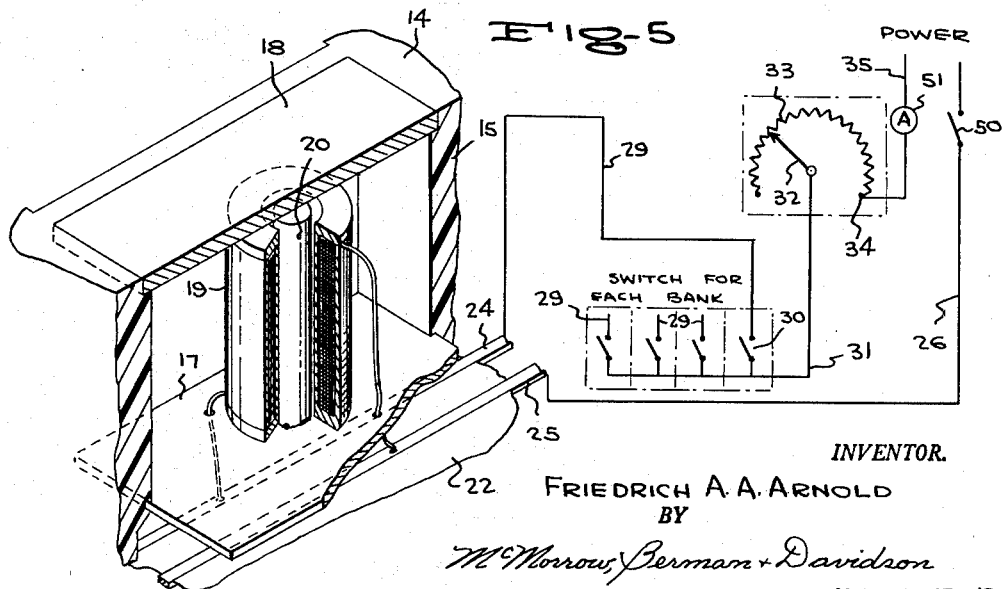
INVENTOR.
FRIEDRICH A. A. ARNOLD
BY
McMorrow, Berman & Davidson
ATTORNEYS

United States Patent Office 2,984,438
Patented May 16, 1961

2,984,438

MAGNETIC SAFETY BARRIER FOR AIRCRAFT LANDING STRIPS

Friedrich A. A. Arnold, 56 S. Baldwin Place, Amityville, N.Y.

Filed Feb. 6, 1959, Ser. No. 791,717

2 Claims. (Cl. 244—110)

This invention relates to aircraft landing fields, and more particularly to safety devices for use on aircraft landing strips to control the movement of aircraft landing thereon and to prevent overrunning of the strips.

A main object of the invention is to provide a novel and improved retarding means for use in conjunction with aircraft landing fields to control the movement of aircraft landing on the field and to prevent the aircraft from overrunning the landing strips thereof, the apparatus being relatively simple in construtcion, being easy to install, and providing accurate control of an aircraft utilizing same so that the movement of the aircraft when landing may be retarded in a safe and smooth manner and so that the length of the landing strip may be much shorter than would be necessary if no retarding means were employed.

A further object of the invention is to provide an improved retarding system for use on aircraft landing fields in conjunction with cooperating means on aircraft, the system providing control of the movement of an aircraft landing on a landing strip and preventing the aircraft from overrunning the strip, the system involving relatively inexpensive components, requiring a minimum amount of space on the landing field for the installation thereof, and being arranged so that the action of the system may be accurately controlled from the control tower of the air field or from any other convenient location.

A still further object of the invention is to provide an improved aircraft retarder for use on landing strips, the retarder being easy to fabricate, being durable in construction, and involving no moving parts.

A still further object of the invention is to provide an improved retarding arrangement for aircraft landing strips, said arrangement involving no upwardly protruding or otherwise obstructing elements which would interfere with the movement of an aircraft over the strips, the retarding assembly being wholly confined below ground level and being electrically controlled so that the degree of retarding action provided thereby may be varied in accordance with the size and nature of the aircraft landing on the air field.

A still further object of the invention is to provide an improved electrically energized retarding assembly for air strips, the assembly being useful for controlling the movement of aircraft landing on an air strip, as well as for controlling aircraft preparing to take off from the air strip so as to prevent premature takeoff and to allow the aircraft to develop sufficient traction to insure safe takeoff.

Further objects and advantages of the invention will become apparent from the following description and claims, and from the accompanying drawings, wherein:

Figure 1 is a perspective view of an aircraft landing strip constructed in accordance with the present invention and illustrating an aircraft using the strip and being retarded in its movement thereover by the magnetic force of the electromagnets included in the strip sections.

Figure 2 is an enlarged fragmentary longitudinal vertical cross sectional view taken through the lower portion of the aircraft fuselage containing the pivoted magnetic shoe member adapted to cooperate with the landing strip of Figure 1.

Figure 3 is an enlarged fragmentary transverse vertical cross sectional view taken on the line 3—3 of Figure 1.

Figure 4 is a fragmentary vertical cross sectional view taken on the line 4—4 of Figure 3.

Figure 5 is a fragmentary perspective view of one of the electro-magnets and the adjacent portions of the associated landing strip section, as employed in the structure shown in Figures 1, 3 and 4, a portion of the electro-magnet being broken away to show its core, and the electro-magnet being shown directly connected to an associated energizing circuit.

Referring to the drawings, 11 generally designates an aircraft landing strip constructed in accordance with the present invention, the landing strip comprising a plurality of generally rectangular, successive landing sections 12, the sections being of substantial size and being spaced successively and in alignment to define a landing path adapted to receive an aircraft 13 during the landing of the aircraft.

As will be presently explained, the strip 11 may also be employed to control the movement of an aircraft during takeoff, the strip being adapted to provide a retarding action which may be controlled in a manner to allow an aircraft to develop a substantial degree of traction before releasing same for takeoff, whereby takeoff may be accomplished in a relatively short distance, as compared with the normal distance required.

Each of the landing strip sections 12 comprises a generally rectangular frame 14, preferably of non-magnetic material, the frame being of substantial area and being provided with longitudinal and transverse spaced partition members 15 defining a plurality of generally rectangular cells 16 therein. Secured in the lower portion of each of the cells 16 is a rigid bottom plate member 17, and secured to the top marginal portions of the walls of each cell 16 is a top plate member 18, preferably of non-magnetic material. Centrally mounted in each cell 16 is an electro-magnet 19 provided with a vertical core 20 whose top end is located immediately subjacent the associated top cover plate 18, as shown in Figure 5.

The electro-magnets 19 are rigidly secured in any suitable manner in their respective cells 16, the electro-magnets being thus evenly spaced over the frames 14, and the top covers 18 being flush with the top planes of the frames.

As shown in Figures 3 and 4, the sections 12 are installed in the aircraft runway with the top planes of their associated frames 14 flush with the surface of the runway, shown at 21, whereby the sections present no obstructions or other mechanical projections on the runway.

Each frame 14 is provided with a bottom cover plate 22 of insulating material, and embedded therein beneath the respective longitudinal rows of magnets 19 are respective pairs of spaced conductor strips 24, 25, one terminal of the winding of each electromagnet 19 being connected to a conductor strip 24 and the other terminal of each of the electro-magnet windings being connected to a conductor 25. The conductor strips 24 of each section 12 are electrically connected together, and similarly the conductor strips 25 of each section are electrically connected together by suitable conductors, not shown. As shown in Figure 5, the conductors 25 are electrically connected to a power line wire 26 contained in a suitable cable 27 extending from the associated sections 12 toward a control desk 28 located in the air field control tower or in any other suitable location within view of the air strip. Each cable 27 contains an additional power line wire 29 electrically connected to the remaining conductor strips 24 of the section.

Respective control switches 30 are provided on the control desk 28, each switch 30 being associated with a specific landing strip section 12, the power line conductor 29 associated with the strip being connected to one terminal of the switch 30. The other terminal of each switch 30 is connected to a wire 31, which is in turn connected to the adjustable contact 32 of a control rheostat 33. The remaining terminal 34 of the control rheostat is connected to a supply power line wire 35, which, together with the first-named power line wire 26, connected to the conductor strips 25 of all the sections 12, is electrically connected to a suitable power supply source.

As will be readily apparent from Figure 5, the electro-magnets of the respective landing strip sections 12 may be selectively energized by closing their associated control switches 30. The degree of energization of the electromagnets may be further controlled by adjusting the control rheostat 33, which is located on the panel of the control desk 28, as shown in Figure 1, whereby to provide a desired degree of retarding action on an aircraft using the strip, either for landing, or for takeoff, as above mentioned.

An aircraft using the landing strip, for example, the aircraft 13, is provided in the bottom wall 36 of its fuselage with an aperture 37, and pivoted in the lower portion of the fuselage at 38 is an arm 39 which is rotatable through the aperture 37 and which has secured to its bottom edge an arcuately curved shoe member 40 of magnetic material, such as spring steel, or the like. The shoe member 40 is preferably resilient so that it may engage the surface of a landing strip and flex somewhat, so as to prevent an impact from being transmitted to the aircraft while it is traveling over the strip. Thus, the shoe member 40, being relatively yieldable, will engage the landing strip with wiping contact and will be subject to the magnetic force provided by the electro-magnets 19 in the strip sections 12, whereby to transmit a retarding force to the aircraft through the supporting arm 39.

Rigidly secured to the internal end of the supporting arm 39 is an upstanding projection 41 of substantial length pivotally connected at 42 to the end of the piston rod 43 of a pivoted fluid pressure cylinder 44. The cylinder 44 is pivoted at 45 to the fuselage wall 36, and is provided with suitable conduit means 47, 48, connecting opposite ends of the cylinder to a suitable source of hydraulic fluid through conventional control valves, whereby the hydraulic fluid may be selectively admitted to the opposite end portions of the cylinder 44, and whereby the arm 39 may be either raised or lowered, in accordance with the operation of the associated control valve.

Normally, namely, while the aircraft is in flight, the piston rod 43 is retracted, whereby the arm 39 is elevated into the aperture 37 and whereby the flexible shoe member 40 is held in a position closely adjacent to the bottom surface of the fueslage wall 36, as shown in dotted view in Figure 2. When the aircraft is to make a landing, or is to take off from the air field, the arm 39 is lowered to the full view position shown in Figure 2, by operating the associated control valve in the aircraft to admit hydraulic fluid into cylinder 44 through the conduit 48 and to allow the opposite end portion of the cylinder to discharge through the conduit 47. With the flexible shoe member 40 in its depending position, said shoe member is engageable with the top surface of the landing strip sections 12, as shown for example, in Figures 1 and 3, whereby the magnets 19 in the sections exert magnetic force on the magnetic shoe member 40. Thus, in landing on the strip sections 12, the electro-magnets 19 exert a retarding force on the aircraft through the magnetic shoe member 40, and the degree of said retarding force may be controlled by suitably adjusting the rotatable contact arm 32 of rheostat 33. The energization of the successive strip sections 12 may be individually controlled by means of the associated energizing switches 30, as above explained, whereby any desired number of retarding strip sections may be energized.

In taking off from the landing field, the strip sections 12 may be employed to exert a retarding action on the depending flexible shoe member 40 of the aircraft so as to retard the aircraft until the propellers or other traction means of the aircraft develop a substantial degree of traction, allowing the aircraft to take off from the strip in a relatively short distance, as soon as the retarding magnets are deenergized.

As will be readily apparent, the magnetic strip sections 12 may therefore be employed as a holding means for the aircraft, taking the place of the blocks or similar holding means previously employed to prevent movement of the aircraft until its propeller or other traction means has developed a substantial degree of traction. The retarding effect may be terminated by opening the associated control switches 30 of the respective landing strips, or by opening a main control switch 50 which may be included in the main energizing circuit, for example, in one of the power supply line wires 35 or 26. For example, the main control switch 50 may be included in the power supply wire 26, as shown in Figure 5.

The control panel of the control desk 28 may be provided with suitable instruments, such as an ammeter 51 to indicate the current in the retarding strip circuit, and with suitable additional instruments providing information with respect to the position and speed of an aircraft 13 using the landing strip. The control desk 28 may also contain the usual communication equipment for communicating with the personnel of aircraft using the landing strip and for making the usual observations and tests ordinarily required in connection with landing and takeoff of aircraft on an air field.

Although shown in conjunction with an air field, the apparatus above described is also suitable for use on the deck of aircraft carriers and may be employed in conjunction with conventionally powered aircraft as well as aircraft of the jet-powered type.

While a specific embodiment of an improved electromagnetic retarding system for use on aircraft landing strips has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an aircraft landing strip, a plurality of horizontal successive landing sections, each section comprising a generally rectangular frame of non-magnetic material, the frame being of substantial area and being provided with longitudinal and transverse spaced partition members defining a plurality of generally rectangular cells therein, a rigid bottom plate secured in the lower portion of each cell, a non-magnetic top plate secured to the top marginal portions of the walls of each cell and being flush with the top plane of the sections, an electromagnet centrally mounted in each cell, said electromagnet having a vertical core whose top end is located immediately subjacent the top plate of the cell, a bottom cover plate of insulating material beneath each frame, respective pairs of conductor strips embedded in each bottom cover plate, one terminal of each electromagnet in the frame being connected to one conductor strip and the other terminal of each electromagnet in the frame being connected to the other conductor strip, a source of current, and means to simultaneously connect selected pairs of said conductor strips to said source of current, whereby to simultaneously energize the electromagnets of the associated frames, and whereby the energized electromagnets are adapted to exert a retarding force on a magnetic portion of an aircraft passing over said associated frames.

2. In an aircraft landing strip, a plurality of horizontal successive landing sections, each section comprising a generally rectangular frame of non-magnetic material, the frame being of substantial area and being provided with longitudinal and transverse spaced partition members defining a plurality of generally rectangular cells therein, a rigid bottom plate secured in the lower portion of each cell, a non-magnetic top plate secured to the top marginal portions of the walls of each cell and being flush with the top plane of the sections, an electromagnet centrally mounted in each cell, said electromagnet having a vertical core whose top end is located immediately subjacent the top plate of the cell, a bottom cover plate of insulating material beneath each frame, respective pairs of conductor strips embedded in each bottom cover plate, one terminal of each electromagnet in the frame being connected to one conductor strip and the other terminal of each electromagnet in the frame being connected to the other conductor strip, a source of current, and means including respective individual control switches connecting the pairs of conductor strips to said source of current, whereby selected pairs of conductor strips may be simultaneously connected to said source of current to simultaneously energize the electromagnets of the frames containing the selected pairs of conductor strips, and whereby the energized electromagnets are adapted to exert a retarding force on a magnetic portion of an aircraft passing over said last-named frames.

References Cited in the file of this patent

UNITED STATES PATENTS

| 1,421,846 | Scholfield | July 4, 1922 |
| 1,489,746 | Eagles | Apr. 8, 1924 |

FOREIGN PATENTS

| 137,974 | Great Britain | Jan. 29, 1920 |
| 151,384 | Great Britain | Sept. 30, 1920 |